United States Patent
Uemura et al.

(10) Patent No.: US 10,589,810 B2
(45) Date of Patent: Mar. 17, 2020

(54) LEGGED MECHANISM, WALKING ROBOT, METHOD FOR CONTROLLING POSTURE, AND RECORDING MEDIUM

(71) Applicant: OSAKA UNIVERSITY, Suita-shi, Osaka (JP)

(72) Inventors: Mitsunori Uemura, Suita (JP); Fumio Miyazaki, Suita (JP); Hiroaki Hirai, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 208 days.

(21) Appl. No.: 15/562,478

(22) PCT Filed: Apr. 1, 2016

(86) PCT No.: PCT/JP2016/060915
§ 371 (c)(1),
(2) Date: Sep. 28, 2017

(87) PCT Pub. No.: WO2016/159346
PCT Pub. Date: Oct. 6, 2016

(65) Prior Publication Data
US 2018/0093725 A1    Apr. 5, 2018

(30) Foreign Application Priority Data
Apr. 2, 2015 (JP) ................. 2015-075922

(51) Int. Cl.
*B62D 57/032* (2006.01)
*B25J 5/00* (2006.01)
*B25J 13/08* (2006.01)

(52) U.S. Cl.
CPC .............. *B62D 57/032* (2013.01); *B25J 5/00* (2013.01); *B25J 13/088* (2013.01)

(58) Field of Classification Search
CPC .......... B62D 57/032; B62D 57/02; B25J 5/00; B25J 13/088; G05B 2219/40264; Y10S 901/01; Y10S 901/48
(Continued)

(56) References Cited

U.S. PATENT DOCUMENTS

| 7,734,377 B2 | 6/2010 | Hasegawa |
| 7,835,822 B2 | 11/2010 | Goswami et al. |

(Continued)

OTHER PUBLICATIONS

International Search Report issued in Intl. Appln. No. PCT/JP2016/060915 dated May 24, 2016. English translation provided.
(Continued)

*Primary Examiner* — Bao Long T Nguyen
(74) *Attorney, Agent, or Firm* — Rossi, Kimms & McDowell LLP

(57) ABSTRACT

A walking robot (1) includes a body (20) joined with an upper part of two legs (10) so that the body has a changeable posture relative to the legs; and a posture control unit (105, 106, 107) configured to control a posture of the body stably in accordance with states of the legs (10) and the body (20). The walking robot includes: a state calculation unit (101, 102, 103) configured to calculate periodically, from angular information on the legs (10) and the body (20), angular momentum $p_1$ around a lower end of the leg in a stance phase and integral $p_{I1}$ of the angular momentum; and a stabilization determination unit (104) configured to determine whether the calculated angular momentum $p_1$ and integral $p_{I1}$ are approaching or getting away from target values, and output a result of the determination to the posture control unit (105, 106, 107).

8 Claims, 7 Drawing Sheets

(58) Field of Classification Search
USPC .................. 700/245, 250, 258; 901/1, 48; 318/568.12
See application file for complete search history.

(56) References Cited

U.S. PATENT DOCUMENTS

| | | | |
|---|---|---|---|
| 2005/0021176 A1* | 1/2005 | Takenaka | B62D 57/02 700/245 |
| 2005/0234593 A1* | 10/2005 | Goswami | B62D 57/032 700/245 |
| 2006/0173578 A1* | 8/2006 | Takenaka | B62D 57/032 700/245 |
| 2006/0247800 A1* | 11/2006 | Takenaka | B62D 57/032 700/54 |
| 2007/0016329 A1 | 1/2007 | Herr et al. | |
| 2009/0187275 A1* | 7/2009 | Suga | B62D 57/032 700/245 |
| 2011/0213495 A1* | 9/2011 | Orita | B25J 9/163 700/254 |
| 2011/0213496 A1* | 9/2011 | Orita | B62D 57/032 700/254 |
| 2012/0316684 A1* | 12/2012 | Lee | B62D 57/032 700/261 |
| 2013/0013111 A1 | 1/2013 | Hurst et al. | |

OTHER PUBLICATIONS

Written Opinion issued in Intl. Appln. No. PCT/JP2016/060915 dated May 24, 2016.

Sugihara. 2012. IEEE/RSJ International Conference on Intelligent Robots and Systems. Oct. 7-12, 2012. "Biped Control to Follow Arbitrary Referential Longitudinal Velocity Based on Dynamics Morphing." pp. 1892-1897. Provides an English equivalent of Sugihara. 2011. "Dynamics Morphing Toward Arbitrary Longitudinal Velocity Control for Biped Robots." from the 29th Annual Conference of Robotics Society in Japan. Submitted in an IDS on Sep. 28, 2017.

\* cited by examiner $P_I - P_{II}$ PHASE DIAGRAM $P_I - P_{II}$ PHASE DIAGRAM $P_I - P_{II}$ PHASE DIAGRAM

LEGGED MECHANISM, WALKING ROBOT, METHOD FOR CONTROLLING POSTURE, AND RECORDING MEDIUM

TECHNICAL FIELD

The present invention relates to a legged mechanism or a walking robot having a plurality of legs for walking (running), for assisting and supporting the walking and for analyzing the posture, and relates to a technique for controlling the posture.

BACKGROUND ART

A legged robot can walk and is good at travelling in the human living environment including uneven terrain, and so the basic technology therefor has been researched actively. In spite of the competition for such active researches, the technique for controlling a legged robot and its hardware technique have a limit, and few legged robots in practical use exist. Technical problems of the legged robots are that the robots have a large size and heavy weight, the cost is high, the moving speed is low, and the robots may fall, for example. Many of these problems result from a problem in the control technique or the robot having a lot of actuators. The balance of a conventional legged robot often is controlled based on ZMP (Zero Moment Point). However, if the ZMP is outside of the plane including the soles of the both feet, the heel or the toe of the robot will float. Then the toe or the heel on the side in contact with the ground has a state equal to a joint without actuator.

Few effective methods for controlling the balance in that case have been proposed. In many conventional techniques to control robots, the robot has two actuators at their ankles to control its total freedom. Such two actuators attached to the end of each leg, however, increase in size and weight of the end of the legs and increase in cost. Moving of the end of the legs requires actuators at the knees and the hip joint also having higher output. This means an increase in size of the knees and a part around the hip and an increase in weight and cost. As a result, the robot as a whole increases in size and weight, increases in cost, and decreases in moving speed. Legged robots without actuators at the ankles also have been researched, although fewer in number. Due to such researches, control algorithm enabling the gait of a robot at a certain speed is being established. This can eliminate the four actuators in total at the ankles of both legs, and so can contribute to downsizing, lighter weight, lower cost, and higher moving speed of the robot.

Keeping a certain upright posture of a robot without actuators at the ankles is essential to realize a legged robot. However, the technique for controlling a robot to keep a certain upright posture is extremely insufficient conventionally. This is an issue to be addressed.

Patent Literature 1 describes a method for controlling the posture of an articulated robot. This method enables the robot to return to its original upright posture after a small external force acts on the robot. Non Patent Literature 1 describes a technique relating to a legged robot with actuators at the ankles. The technique specifies a maximum range of enabling the robot to return to its original posture using the torque at ankles when the robot is pushed by an external force or the like.

CITATION LIST

Patent Literature

Patent Literature 1: Japanese Patent Application Laid-Open No. 2006-75945

Non Patent Literature

Non Patent Literature 1: Tomomichi SUGIHARA, "Standing Stabilizability and Stepping Maneuver of Bipedalism based on the Best COM-ZMP Regulator" The 14th Robotics Symposia, PP. 435-440, 2009

SUMMARY OF INVENTION

Technical Problem

According to the method for controlling the posture in Patent Literature 1, a robot will fall when large external force acts on the robot, and this literature does not evaluate a method for determining a state of the robot as to whether the robot can return to its original upright posture from the state.

Non Patent Literature 1 shows the control technique of a robot that is limited to the case where an external force acts on the center of gravity. This literature describes a legged robot of a type having actuators at the ankles. When the actuator at an ankle outputs above certain ankle torque, the corresponding heel or toe leaves the ground. Then the toe or heel in contact with the ground has a state similar to a joint without actuator. In such a case, the control method of Non Patent Literature 1 cannot control the posture. Further, this literature assumes the angular momentum around the position of the center of gravity of the robot at 0. Therefore this method cannot handle the case where the angular momentum is generated around the position of the center of gravity of the robot. In this way, the method has a certain limit for realistic algorithm.

In view of the above, the present invention aims to provide a legged mechanism, a walking robot, a method for controlling posture, and a recording medium, by which the robot can be controlled so as to avoid falling irrespective of the presence or not of an actuator at the ankle and by using the angular momentum around the ankle and its integral.

Solution to Problem

A legged mechanism according to the present invention includes: at least one leg and a body joined with an upper part of the leg so that the body has a changeable posture relative to the leg; and a posture control unit configured to control a posture of the body stably in accordance with states of the leg and the body. The legged mechanism further includes: a state calculation unit configured to calculate periodically, from angular information on the leg and the body, angular momentum around a lower end of the leg in a stance phase and integral of the angular momentum; and a determination unit configured to determine whether the calculated angular momentum and integral are approaching or getting away from target values, and output a result of the determination to the posture control unit.

A method for controlling posture of a legged mechanism according to the present invention is to control a posture of the legged mechanism including: at least one leg and a body joined with an upper part of the leg so that the body has a changeable posture relative to the leg; and a posture control unit configured to control a posture of the body stably in accordance with states of the leg and the body. The method includes: a state calculation step of calculating periodically, from angular information on the leg and the body, angular momentum around a lower end of the leg in a stance phase and integral of the angular momentum; and a determination step of determining whether the calculated angular momentum and integral are approaching or getting away from target values, and outputting a result of the determination to the posture control unit.

A recording medium according to the present invention is a computer readable recording medium having stored thereon a program, and the program is to control a posture of a body stably, the body being joined with an upper part of at least one leg so that the body has a changeable posture relative to the leg, the control being performed in accordance with states of the leg and the body. The program makes a computer execute: a state calculation step of calculating periodically, from angular information on the leg and the body, angular momentum around a lower end of the leg in a stance phase and integral of the angular momentum; and a determination step of determining whether the calculated angular momentum and integral are approaching or getting away from target values, and feeding a result of the determination to posture control processing.

With these aspects of the present invention, the body of the legged mechanism is joined with an upper part of at least one leg so that the body has a changeable posture relative to the leg; and the posture control unit can control a posture of the body stably in accordance with states of the leg and the body. The state calculation unit calculates periodically, from angular information on the leg and the body, angular momentum around a lower end of the leg in a stance phase and integral of the angular momentum, and the stabilization determination unit determines whether the calculated angular momentum and integral are approaching or getting away from target values, and outputs a result of the determination to the posture control unit. Thus, the legged mechanism has a simple configuration, and can keep the balance of the posture of the body, i.e., of the posture of the legged mechanism, so that the legged mechanism can avoid the falling against disturbance including external force.

Advantageous Effects of Invention

According to the present invention, the legged mechanism can be controlled so as to avoid falling using the angular momentum around the ankle and its integral.

DESCRIPTION OF EMBODIMENTS

Figure 1:
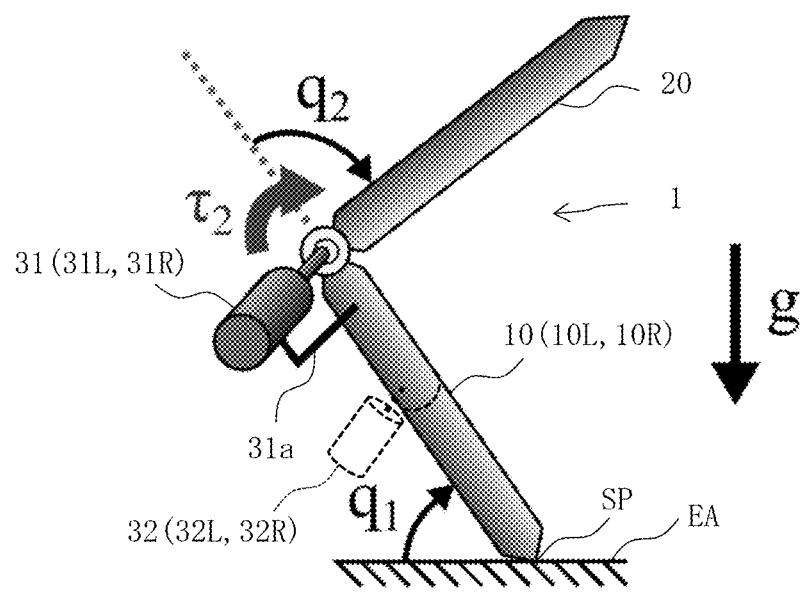
FIG. 1 shows the configuration of a walking robot as a model according to the present invention.
Figure 2:
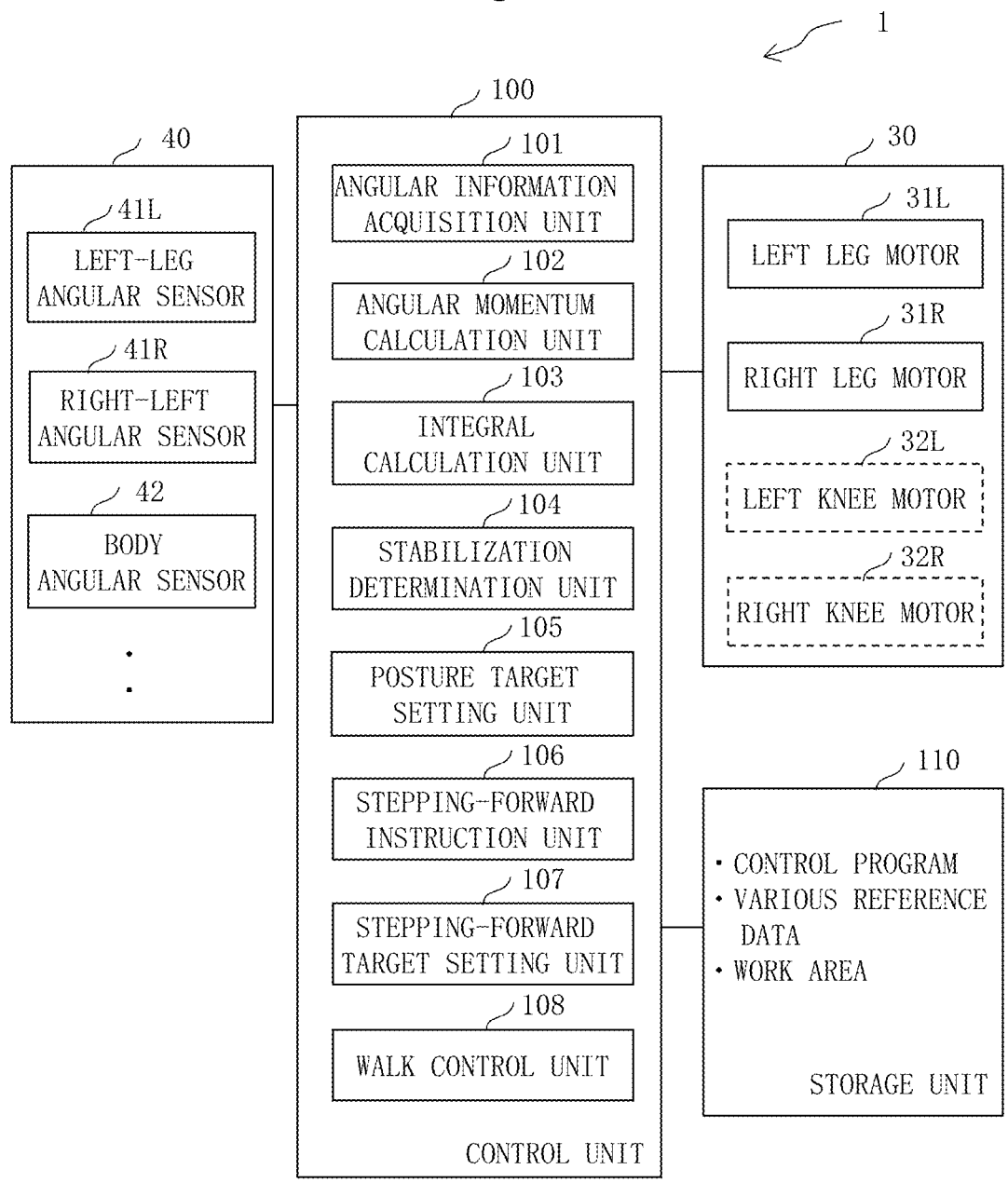
FIG. 2 shows the functional configuration of the walking robot.

FIG. 1 shows the configuration of a walking robot as a model according to the present invention. FIG. 2 shows the functional configuration of the walking robot. Hereinafter the walking robot is simply called a robot 1.

The robot 1 includes a plurality of links, e.g., two legs 10 (10L, 10R) that are symmetrical in the depth of the sheet of FIG. 1, and a body 20 as a main body joined with an upper part of each of the leg 10L, 10R. The upper part of each leg 10L, 10R is joined with the lower part of the body 20 via a leg motor 31 (left leg motor 31L and right leg motor 31R). The leg motor 31 is one example of the leg actuator corresponding to the joint.

The leg motor 31 allows the body 20 to change its posture relative to the legs 10. Angle q1 is the angle between one leg 10 and the horizontal ground EA (angle relative to the gravity direction). Angle q2 is the angle between one leg 10 and the body 20. Angle q1 changes with the relative rotation of the leg 10 in the swing state. Angle q2 changes with the relative rotation between the body 20 and one leg 10. Specifically angle q2 changes with the driving of the leg motor 31 at one of the legs 10 in contact with the ground EA or with the synchronous driving of the leg motor 31 of both of the legs in contact with the ground. Angle q1 changes with disturbance. Angle q1 also changes indirectly when the position of the center of gravity of the robot changes with the change of angle q2 and so the robot as a whole rotates around the ankle.

Each leg 10 may be divided at some position along the longitudinal direction, and the divided parts of the leg may be joined via a knee motor 32 (left knee motor 32L and right knee motor 32R) as the knee actuator for knee joint so that they can rotate relatively around the knee or so that the length of the leg can be adjusted by elongating or contracting the knee part. In this case, the rotary axes of the leg motor 31 and the knee motor 32 are parallel to each other. Such a configuration of dividing each leg 10 and joining the divided parts with the knee motor 32 is not essential. This configuration, however, is preferable to extend the stabilizable range as described later and to improve the precision of the stepping-forward position of the robot if the state of the robot is outside of such a range.

Angular sensor 40 are disposed at parts corresponding to the joints, e.g., at appropriate parts of the left and right legs 10L and 10R and at an appropriate part of the body 20, e.g., at a lower part. The angular sensor 40 of the present embodiment include a left-leg angular sensor 41L and a right-leg angular sensor 41R to detect the angle with the ground EA and a body angular sensor 42 to detect angles with legs 10L and 10R. At least one of the left-leg angular sensor 41L and the right-leg angular sensor 41R, and the body angular sensor 42 is a gravity sensor, which may be an acceleration sensor. Other sensors may be configured to obtain the relative rotating amount at the joint part as the angular information. Such a gravity sensor as any one of the angular sensors enables substitution into an inclination angle relative to the vertical direction (see arrow g in FIG. 1) at each part of the robot 1. This enables calculation to understand the state of the robot 1 as described later.

Although not shown in FIG. 1, the angular sensor 40 may be disposed at each of the joints of the robot 1. This configuration enables calculation of the position of center of gravity of the robot and the angular momentum of the robot based on the information on mass distribution of the body and the legs.

Next, referring to FIG. 1, the following describes a method for controlling the posture of the robot 1 as a model.

(1) Motion Equation on Angular Momentum around the Ankle

In FIG. 1, the depth of the sheet is the horizontal direction, the right of the drawing is the forward, and the left of the drawing is the backward. In FIG. 1, the left and right legs 10L and 10R are overlapped. Although the robot 1 may have an actuator at the ankle at the lower end of the leg 10, the following describes a mode without such an actuator as the present embodiment. For brevity, the following describes a model having a single joint, i.e., a joint (hereinafter called a hip) as a joining part between the legs 10 and the body 20. The following description may apply to a robot having any number of joints as well.

The motion equation of the robot is represented as in Math. 1 using the Lagrange motion equation.

[Math. 1]
$$\frac{d}{dt}\left(\frac{\partial L}{\partial \dot{q}}\right) - \frac{\partial L}{\partial q} = \tau$$
$$L = \frac{1}{2}\dot{q}^T M \dot{q} - mgy_g$$

where $q=(q_1, q_2)^T$ represents the joint angular vector, $\tau=(\tau_1, \tau_2)^T$ represents the actuator torque vector, M denotes the inertial matrix, m denotes the mass of the robot as a whole, g denotes the acceleration of gravity, and $y_g$ denotes the height from the ground to the position of the center of gravity of the robot.

[Math. 2]
$$p = M\dot{q} \qquad (1)$$

The angular momentum vector of the robot, $p=(p_1, p_2)^T$ can be represented as in expression (1).

From these, temporal change of the angular momentum $p_1$ around the ankle can be represented by the following expression.

[Math. 3]
$$\dot{p}_1 = -mgx_g + \tau_1 \qquad (2)$$

where $x_g$ denotes the position of the center of gravity of the robot in the horizontal direction viewed from the contact point between the leg and the ground, and $$x_g = \frac{\partial y_g}{\partial q_1}$$

holds.

When the ankle does not have an actuator as in FIG. 1, $\tau_1 = 0$. In this case, the position of the center of gravity $x_g$ has to be controlled appropriately to control the rotation of the robot 1 around the ankle.

(2) $p_{I1}$ to Keep Upright Posture

The joint angular vector to enable the robot 1 to keep the stable posture (upright posture), i.e., the position for $x_g = 0$ is defined as $q_0$. Then, the approximate value (hereinafter simply called integral or quantity of state) of the integral amount of the angular momentum $p_1$ around the ankle near the posture is defined as follows.

[Math. 4]
$$p_{I1} \sim \int_0^t p_1 dt$$

At this time, the following can be derived as approximation from expression (1) and the characteristics of the inertial matrix M.

[Math. 5]
$$p_{I1} = m_1(q - q_0) \qquad (3)$$

where $m_1$ denotes row vector representing the first row of the inertial matrix M.

By converging these $p_1$ and $p_{I1}$ into 0, the robot 1 does not rotate around the ankle and can keep the upright posture.

(3) Control of $p_1$ and $p_{I1}$ by Adjusting Body Posture

Angle $q_{tr}$ of the body can be defined as $q_{tr}=q_1+q_2-\Pi/2$ from FIG. 1. The robot 1 has the leg motor 31 at the hip position, and so $q_{tr}$ is controllable. Considering the expression on the angular momentum, the following expression holds approximately.

[Math. 6]
$$p_1 + my_g\dot{x}_g = c_{qtr}\dot{q}_{tr} \qquad (4)$$

In this expression, $c_{qtr}$ denotes a positive constant.

Temporal integration of this expression from the upright position $q_0$ leads to the following expression.

[Math. 7]
$$p_{I1} + my_g x_g = c_{qtr} q_{tr} \qquad (5)$$

From expressions (5) and (2), the following equation of state can be obtained, in which $p_1$ and $p_{I1}$ are the quantity of state and $q_{tr}$ is the input.

[Math. 8]
$$\frac{d}{dt}\begin{pmatrix} p_{I1} \\ p_1 \end{pmatrix} = \begin{pmatrix} 0 & 1 \\ \frac{g}{y_g} & 0 \end{pmatrix}\begin{pmatrix} p_{I1} \\ p_1 \end{pmatrix} + \begin{pmatrix} 0 \\ c_{qtr} \end{pmatrix} q_{tr} \qquad (6)$$

Herein the body 20 of the robot 1 cannot bend at a certain angle or more because of the interference with the legs 10. Therefore the following constraint of input is given.

[Math. 9]
$$q_{trmin} \le q_{tr} \le q_{trmax} \qquad (7)$$

Considering these equation of state (6) and constraint of input (7), the maximum range to converge the quantity of state $p_1$ and $P_{I1}$ into 0 is as follows.

[Math. 10]
$$c_{qtr}q_{trmin} \le p_{I1} + \sqrt{\frac{y_g}{g}} p_1 \le c_{qtr}q_{trmax} \qquad (8)$$

Hereinafter this range of expression (8) is called a stabilizable range due to the body posture. The range where expression (8) is not satisfied is called an unstabilizable range. One example of the input to maximize the stabilizable range is as follows.

[Math. 11]
$$q_{tr} = -k_1 p_1 - k_2 p_{I1} \qquad (9)$$

Herein when $q_{tr} \ge q_{trmax}$, then $q_{tr} = q_{trmax}$. When $q_{tr} \ge q_{trmin}$, $q_{tr} = q_{trmin}$. k1 and k2 are constants having a certain range. Therefore when expression (8) is satisfied, the posture of the robot can be stabilized finally by adjusting the angle of the body 20 in accordance with expression (9). When expression (8) is not satisfied, the robot has to step forward with one of the legs 10.

When the robot steps forward with the leg 10 and then the leg 10 lands, if the state is in the stabilizable range, the robot can return to the upright posture. From FIG. 1 and expression (3), at the instant of exchanging between the supporting leg and the swing leg, the value of the joint angular vector q changes, and the value of the integral $p_{f1}$ also changes instantly. Then if expression (8) is satisfied when the leg 10 lands, then the robot can return to the upright posture.

[Math. 12]

$$p_{f1} + \sqrt{\frac{y_g}{g}} \, p_1 = \frac{1}{2} c_{qtr} (q_{trmax} + q_{trmin}) \qquad (10)$$

Then if the forward end of the stepped-forward leg 10 is set to satisfy this expression, the robot can be the furthest away from the unstabilizable region, i.e., can be at the center of the stabilizable range.

Figure 3:
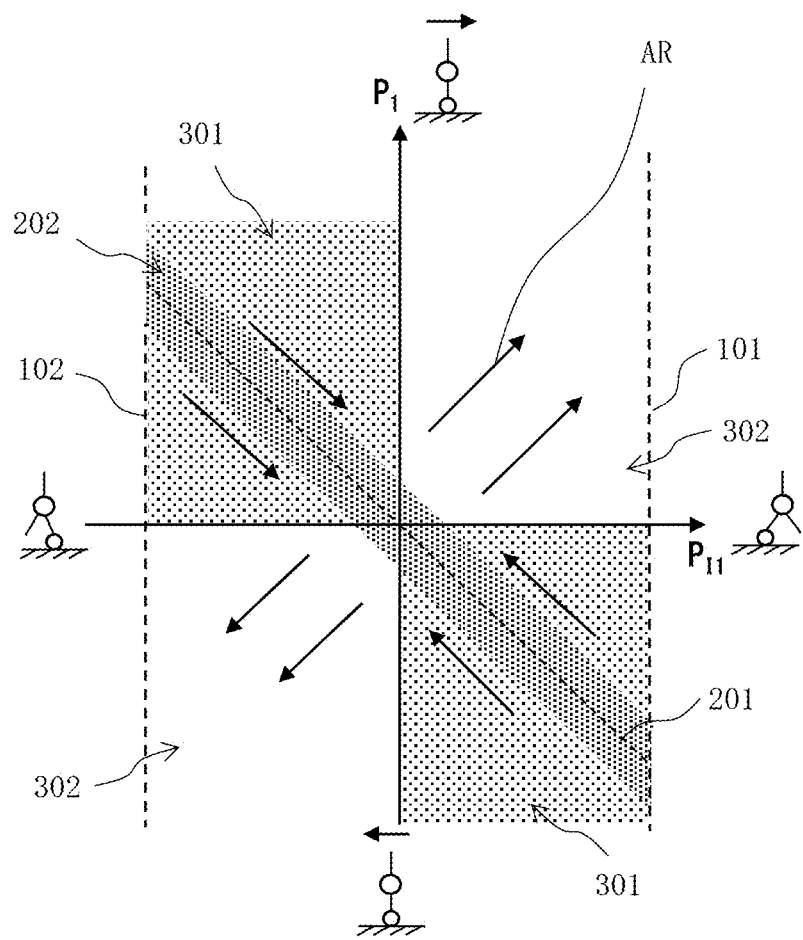
FIG. 3 is a phase diagram, in which the vertical axis represents the angular momentum $p_1$ as the quantity of state and the horizontal axis represents its integral $p_{I1}$.

Next, referring to FIG. 3, the following describes how to stabilize the posture when an external force acts on the robot. FIG. 3 is a phase diagram, in which the vertical axis represents the angular momentum $p_1$ as the quantity of state and the horizontal axis represents its integral $p_{f1}$. The angular momentum $p_1$ represents the momentum of rotation. When the robot 1 as a whole rotates forward around the ankle, the value of the angular momentum $p_1$ is positive, and when the robot rotates backward, the value of the angular momentum $p_1$ is negative. The value of the integral $p_{f1}$ is positive when the robot 1 tilts forward, and is negative when the robot 1 tilts backward.

Arrow AR in FIG. 3 indicates the transition of the quantity of state $p_1$ and $p_{f1}$ when the posture of the body 20 is upright, i.e., when $q_{tr}=0$. To prevent the falling of the robot 1, the joint position (hip) between the legs 10 and the body 20 has to keep a certain height or more. To this end, the value of $p_{f1}$ has to be kept in the region surrounded with lines 101 and 102 on the left and right of FIG. 3.

The meaning of arrow AR is as follows. The state of the robot 1 corresponds to a certain point (state position) in the phase diagram of FIG. 3 at any timing. When the robot keeps this state, the robot 1 transits to the state position in the direction indicated by arrow AR. For instance, when the point corresponding to the current state of the robot 1 is in a light shaded region 301 (second and fourth quadrants), the robot moves along arrow AR over time, and approaches $p_1=0$, $p_{f1}=0$, i.e., the upright stationary (origin) side. When the point corresponding to the current state of the robot 1 is in a region 302 (first and third quadrants), the robot moves along arrow AR over time so that the absolute values of both of $p_1$ and $p_{f1}$ increase. That is, the robot moves away from the origin and exits the region surrounded with the lines 101 and 102 finally.

Line segment 201 passing through the origin in the region 301 means as follows. When the point corresponding to the state of the robot 1 at certain timing is on this line segment 201, the state of the robot transits over time so that $p_1=0$ and $p_{f1}=0$. That is, the robot can reach (return to) the origin.

A dark shaded region 202 is set on both sides of the line segment 201. This region has a certain width. As described above, when the state of the robot 1 at certain timing is on the line segment 201, the robot 1 does not need posture control. Also when the state of the robot is away from the line segment 201, the robot can return to the origin by controlling the posture of the robot 1 as long as it is within a predetermined range. The region 202 shows this predetermined range, which corresponds to the stabilizable range of the body posture represented by expression (8). Expression (9) shows the target value of the body angle $q_{tr}$ to control the body posture in the stabilizable range represented by expression (8). Expression (9) maximizes the stabilizable range within the range of constraint of expression (7).

On the contrary, the region 301 other than the stabilizable range 202 and the region 302 are the unstabilizable range. From these ranges, the robot cannot reach the origin of FIG. 3 (target value of the stabilized posture) without control, and if the robot is left as it is, the robot will fall finally. To avoid this, the robot has to step forward with one of the legs 10 at appropriate timing. When the robot is located in the region 301, it is in the state approaching the origin, and so the robot does not have to step forward with one leg. When the robot is located in the region 302, the robot moves away from the origin over time. Therefore the robot has to step forward with one leg. The leg 10 for stepping forward is on the side to allow the quantity of state $p_{f1}$ of the robot to transit to the region 202 when the leg lands next. When the leg 10 lands, if the state of the robot can be within the region 202, the posture can be stabilized finally. When the leg 10 lands so as to satisfy expression (10), the quantity of state $p_1$, $p_{f1}$ is at the center position of the region 202. Therefore the state of the robot can be the furthest away from the unstabilizable range. If the state of the robot cannot be in the region 202 (e.g., when the quantity of state $p_1$ is too large or too small), the robot may be controlled so as to bring the legs into contact with the ground at the positions of the left and right lines 101 and 102 (as in the robot schematically shown on the left and right of FIG. 3, the swing leg is located at the furthest position from the supporting leg). Thereby, the value of the quantity of state $p_1$ and $p_{f1}$ can be the closest to the origin with the next step of the robot. By repeating this, even if the quantity of state $p_1$ and $p_{f1}$ of the robot is any value, the robot can transit to the stabilizable range finally and can return to the origin using expression (9).

Referring to FIG. 2, the robot 1 includes a controller having a control unit 100 and a storage unit 110 to control the motors 30 and so the robot is autonomous-controllable. The control unit 100 is made up of a microcomputer, for example, and is connected with the motor 30, the angular sensor 40 and the storage unit 110. The storage unit 110 has an area to store a control program and various reference data that is referred to when various calculations are executed, and has a working area. When the control unit 100 executes the control program, the control unit 100 can function as an angular information acquisition unit 101, an angular momentum calculation unit 102, an integral calculation unit 103, a stabilization determination unit 104, a posture target setting unit 105, a stepping-forward instruction unit 106, a stepping-forward target setting unit 107, and a walk control unit 108.

The angular information acquisition unit 101 is to fetch angular information from each of the angular sensor 40 with a predetermined period, e.g., at about every 0.01 to 0.0001 second, and at about every 0.001 second typically. This period for fetching can be set in an appropriate range depending on the intended use, for example. The angular momentum calculation unit 102 is to execute expression (1) for calculation of the angular momentum $p_1$ around the ankle of the leg 10 as the supporting leg every time the angular information is fetched. The integral calculation unit 103 executes expression (3) to calculate the approximate integral $p_{I1}$.

The stabilization determination unit 104 executes the determination processing of expression (8) based on various constrains conditions every time the angular momentum $p_1$ and the integral $p_{I1}$ are obtained. If the determination condition is satisfied, the stabilization determination unit 104 determines that the state of the robot is in the stabilizable range, and if the condition is not satisfied, the stabilization determination unit 104 determines that the state of the robot is in the unstabilizable range. When the determination result shows the stabilizable range, the posture target setting unit 105 generates a target value obtained from expression (9) as a posture control signal of the body 20.

When the determination result shows the unstabilizable range, the stepping-forward instruction unit 106 instructs one of the legs 10, e.g., the leg 10 closer to the direction for instability, to step forward. The stepping-forward target setting unit 107 calculates an instruction value of the forward-end position for the leg 10 that received the stepping-forward instruction so that expression (10) can be satisfied when the leg lands next time. For the stepped-forward swing leg and the supporting leg, at the instant of the contact of the swing leg 10 with the ground EA, the swing leg turns into the supporting leg. At the same time, the supporting leg turns into the swing leg. When the swing leg and the supporting leg are exchanged, the value of the joint angular vector q changes and the value of the integral $p_{I1}$ also changes instantly based on FIG. 1 and expression (3). This value can have any value in the region surrounded with the lines 101 and 102 by adjusting the position for landing of the leg 10. It is assumed here that an impulsive force generated from collision with a leg 10 and the ground EA is 0 during exchanging between the swing leg and the supporting leg, and the value of $p_1$ does not change during exchanging between the swing leg and the supporting leg. Alternatively, it may be assumed that the value of $p_1$ changes.

When the robot steps forward with one of the legs 10 and lands with the leg, then a determination is made whether the state is within the stabilizable range. If it is determined that the state is within the stabilizable range, i.e., satisfies expression (8), then the robot can return to the upright stationary posture using expression (9). Herein the target value obtained from expression (10) may be set, whereby the state of the robot can be on the line segment 201.

On the contrary, if it is determined at the determination following the landing of the leg that the posture is in the unstabilizable range, the swing leg 10 may be controlled so as to land at the furthest position from the supporting leg, so that the legs are located on the lines 101 and 102. Thereby, the quantity of state $p_1$ and $p_{I1}$ can be the closest to the origin when the robot steps forward with the next leg, and so the robot can return to the upright posture finally. The angular information acquisition unit 101 through the stepping-forward target setting unit 107 repeat such processing, whereby instability of the posture due to disturbance can be corrected to a stable posture without moving the legs 10 or by moving the legs.

The walk control unit 108 controls the legs 10L and 10R so that the legs can be stepped forward alternately at a predetermined speed. The details of the processing for stepping forward with the legs 10 alternately without falling for walking are described later.

Figure 4:
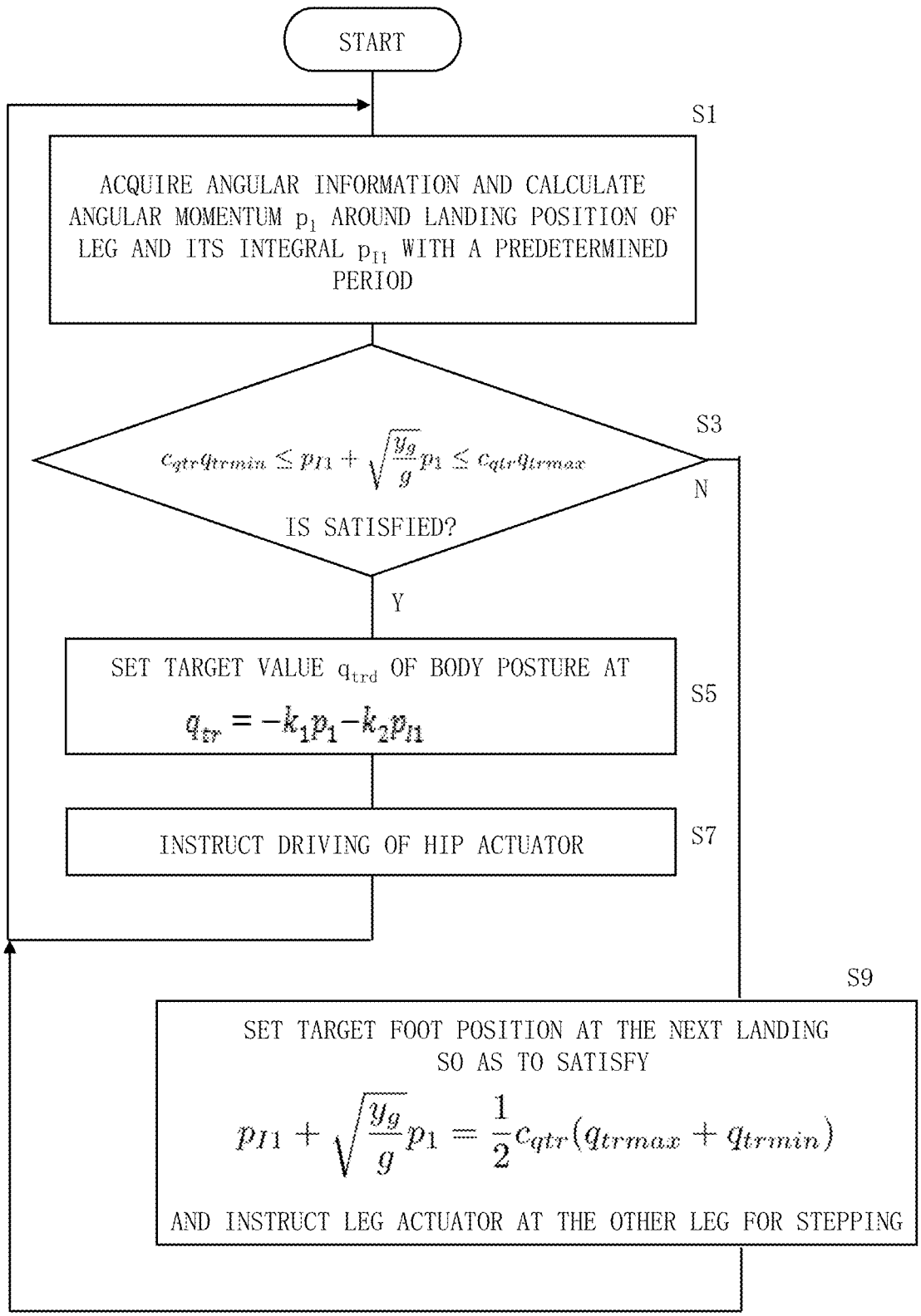
FIG. 4 is a flowchart of the processing to stabilize the posture against external force.

Next, referring to the flowchart of FIG. 4, the following describes the processing to stabilize the posture against external force. Firstly the control unit 100 acquires angular information and calculates the angular momentum $p_1$ around the landing position (around the ankle) of the leg 10 and its integral $p_{I1}$ with a predetermined period (Step S1). Next, the control unit 100 executes the determination processing based on expression (8) using the calculated angular momentum $p_1$ and its integral $p_{I1}$ (Step S3). If the determination result shows the stabilizable range, the control unit 100 sets the target value $q_{trd}$ of the body posture based on expression (9) (Step S5), and instructs the leg motor 31 about synchronous driving (Step S7). In this case, the control unit 100 repeats Steps S1 to S5 with a predetermined period, whereby the state of the robot can return to the origin finally.

On the contrary, if the determination result at Step S3 shows the unstabilizable range, the control unit 100 sets the target foot position based on expression (10) and instructs the leg motor 31 at one of the legs 10 to drive the leg to step forward (Step S9). Next, the procedure returns to Step S1. Then determination is made at Step S3 of the next detection period whether the state is in the stabilizable range or not. If it is determined that it is within the range, the robot will return to the origin finally. On the contrary, if it is not within the range, the control unit 100 repeats Step S9 until the state can be within the range so as to be YES at Step S3 finally.

Next, the following describes (4) Control for the mode having an actuator at the ankle.

Figure 5:
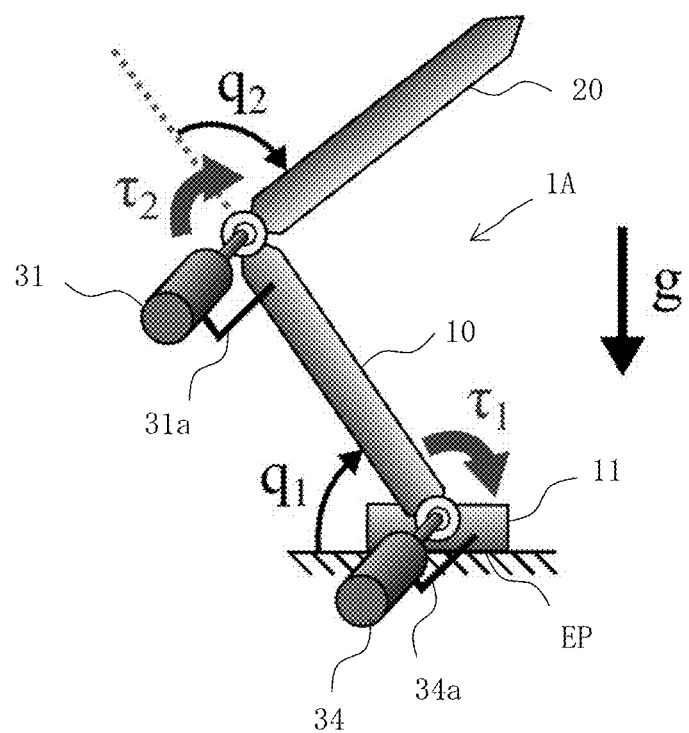
FIG. 5 corresponds to FIG. 1, showing the configuration of the embodiment having an actuator at the ankle.

The above (1) to (3) can apply to a robot 1A as in FIG. 5, which has a foot 11 at the lower end of the leg 10 via an ankle joint, and includes an ankle motor 34 as an actuator attached to the ankle joint. The ankle motor 34 changes the angle of the leg 10 relative to the foot 11 that is in contact with the ground EA. When the foot 11 has the ankle motor 34, $\tau_1$ of expression (2) in a certain range can be generated.

[Math. 13]

$$\tau_{1min} \leq \tau_1 \leq \tau_{1max} \quad (11)$$

This range increases with the length from the ankle joint to the toe and the heel of the foot 11. Beyond this range, the toe and the heel move away from the ground. For the toe away from the ground (or the heel), the heel (or the toe) in contact with the ground on the other side have a state equal to the joint without the ankle motor 34 that can rotate around the contacting point. In this case also, a method for controlling without an actuator at the ankle can be used. When the range is within expression (11) so that the posture can be stabilized, the posture can be stabilized with the ankle joint, and therefore the body posture does not need adjustment. Alternatively, the body posture may be adjusted. The following describes the case where the body posture is set to be vertical and $q_{tr}=0$. At this time, the following equation of state can be obtained from expressions (1) and (5), in which $p_1$ and $p_{I1}$ are the quantity of state and $\tau_1$ is the input.

[Math. 14]

$$\frac{d}{dt}\begin{pmatrix} p_{I1} \\ p_1 \end{pmatrix} = \begin{pmatrix} 0 & 1 \\ \frac{g}{y_g} & 0 \end{pmatrix}\begin{pmatrix} p_{I1} \\ p_1 \end{pmatrix} + \begin{pmatrix} 0 \\ 1 \end{pmatrix}\tau_1 \quad (12)$$

Considering this expression (12) and expression (11), the maximum range to converge $p_1$ and $p_{I1}$ into 0 by the ankle torque is as follows.

[Math. 15]

$$\tau_{1min} < \frac{g}{y_g} p_{I1} + \sqrt{\frac{g}{y_g}} \, p_1 < \tau_{1max} \quad (13)$$

The range of expression (13) is called a stabilizable range due to the ankle torque. The range where expression (13) is not satisfied is called an unstabilizable range. One example of the input to maximize the stabilizable range is as follows.

[Math. 16]

$$\tau_1 = -k_3 p_1 - k_4 p_{I1} \quad (14)$$

Herein when $\tau_1 >= \tau_{1max}$, the $\tau_1 = \tau_{1max}$. When $\tau_1 >= \tau_{1min}$, then $\tau_1 = \tau_{1min}$. k3 and k4 are constants having a certain range. Therefore when expression (13) is satisfied, the posture of the robot is stabilized using expression (14). If expression (13) is not satisfied, a method for stabilizing by the posture of the body 20 as stated above is used together. When both of the methods are used, both of $q_{tr}$ and $\tau_1$ as the inputs of expressions (6) and (12) act, and so the stabilizable range will increase as follows.

[Math. 17]

$$\frac{y_g}{g}\tau_{1min} + c_{qtr}q_{trmin} \leq p_{I1} + \sqrt{\frac{y_g}{g}}\,p_1 \leq \frac{y_g}{g}\tau_{1max} + c_{qtr}q_{trmax} \quad (15)$$

If the stabilization fails again in this case, the robot may step forward with one leg 10 and the position of the foot 11 may be controlled so that the posture can be stabilized when the foot 11 lands next as stated above.

(5) Application for Walking Motion

The following describes a method for controlling based on the above explanation to generate a walking motion. When the ankle does not have an actuator, $\tau_1 = 0$ is considered. At this time, the relationship between the current quantity of state $p_1(t)$, $p_{I1}(t)$ and the quantity of state $p_1(t+T)$, $p_{I1}(t+T)$ after T seconds is obtained analytically from expression (6) as follows.

[Math. 18]

$$p_1(t+T) = \frac{c_1}{2}\left(\left(p_{I1}(t) + \frac{p_1(t)}{c_1} - c_2\right)e^{c_1 T} - \left(p_{I1}(t) - \frac{p_1(t)}{c_1} - c_2\right)e^{-c_1 T}\right) \quad (16)$$

$$p_{I1}(t+T) = \frac{1}{2}\left(\left(p_{I1}(t) + \frac{p_1(t)}{c_1} - c_2\right)e^{c_1 T} + \left(p_{I1}(t) - \frac{p_1(t)}{c_1} - c_2\right)e^{-c_1 T}\right) + c_2 \quad (17)$$

where $$c_1 = \sqrt{\frac{g}{y_g}}$$

$$c_2 = my_g c_{qtr} q_{tr}$$

Figure 6:
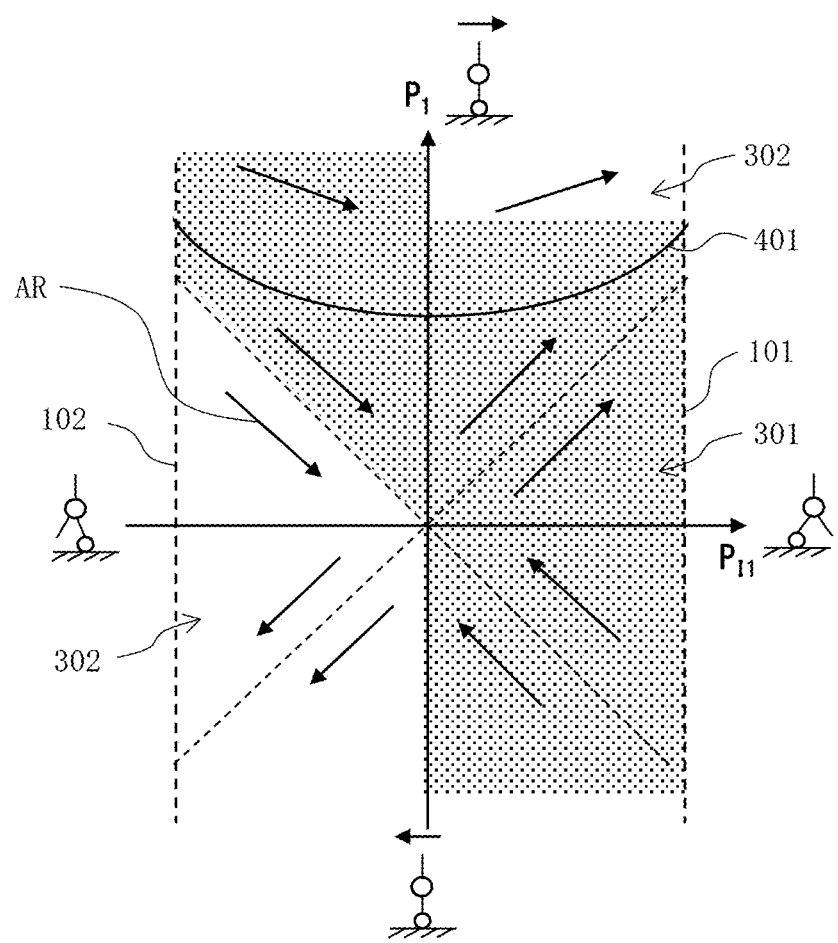
FIG. 6 is a $p_1$-$p_{I1}$ phase diagram to generate a walking motion.

From these expressions (16) and (17), when the body posture is upright, i.e., when $q_{tr}=0$, the transition of $p_1$ and $p_{I1}$ is indicated with arrow AR in FIG. 6. To prevent the falling of the robot, the hip has to keep a certain height or more. To this end, the value of $p_{I1}$ has to be kept in the region surrounded with lines 101 and 102 of FIG. 6. For walking to the right of FIG. 6, the robot may transit from the initial posture having a negative value of $p_{I1}$ to the posture having a positive value of $p_{I1}$, and may return to the same initial posture. One of the orbits to implement this is indicated with a walking line 401 of FIG. 6. Therefore to walk constantly, the state may transit from any point in the region surrounded with the lines 101 and 102 in the drawing to reach the walking line 401 as the target value.

The walk control unit 108 outputs a control signal for alternate stepping-forward operation of both of the legs 10L and 10R and instructs the positions for stepping forward and landing in accordance with control signals from the angular information acquisition unit 101 to the integral calculation unit 103, the stepping-forward instruction unit 106 and the stepping-forward target setting unit 107. To implement this, the swing leg 10 may land at an appropriate position. Herein at the instant of the contact of the swing leg 10 with the ground EA, the swing leg turns into the supporting leg. At the same time, the supporting leg turns into the swing leg. As stated above, when the swing leg and the supporting leg are exchanged, the value of $p_{I1}$ changes instantly. This value can shift to any value in the region surrounded with the lines 101 and 102 by adjusting the position for landing of the leg 10. When the swing leg and the supporting leg are exchanged, the value of $p_1$ also will be affected in accordance with an impulsive force generated from collision with the leg and the ground EA. However, it is assumed that such an impulsive force is 0 as described above, and the value of $p_{I1}$ does not change during exchanging between the swing leg and the supporting leg. The method can apply to the case where the value of $p_{I1}$ changes as well. To let $p_1$ and $p_{I1}$ reach any point on the walking line 401, the following algorithm may be used, for example, and the control unit 100 may execute the algorithm.

When the values of $p_1$ and $p_{I1}$ are in the region 301 of FIG. 6, these values will approach the walking line 401 after a certain period of time. Therefore the robot in this case may continue the current motion. On the contrary, when the values are in the region 302, the robot will move away from the walking line 401. In this case, the swing leg 10 has to land at an appropriate place. When the values are outside of the region surrounded with lines 101 and 102 as well, the swing leg 10 of the robot has to land at an appropriate place to avoid the falling. The landing position of the leg 10 is the position to enable the values of $p_1$ and $p_{I1}$ to be closest to the walking line 401 with next one step. Thereby the state of the robot can reach from any point in the region surrounded with the lines 101 and 102 in FIG. 6 to the walking line 401. Even when the values of $p_1$ and $p_{I1}$ change greatly due to disturbance or the like, the above algorithm may be executed continuously, whereby the state can converge into the target walking state (walking line 401) automatically.

When the state is at the origin of FIG. 6 ($p_1=0$, $p_{I1}=0$), however, the robot during walking will stop. To avoid this, the body 20 may tilt so as to transit the state to the region 301.

Figure 7:
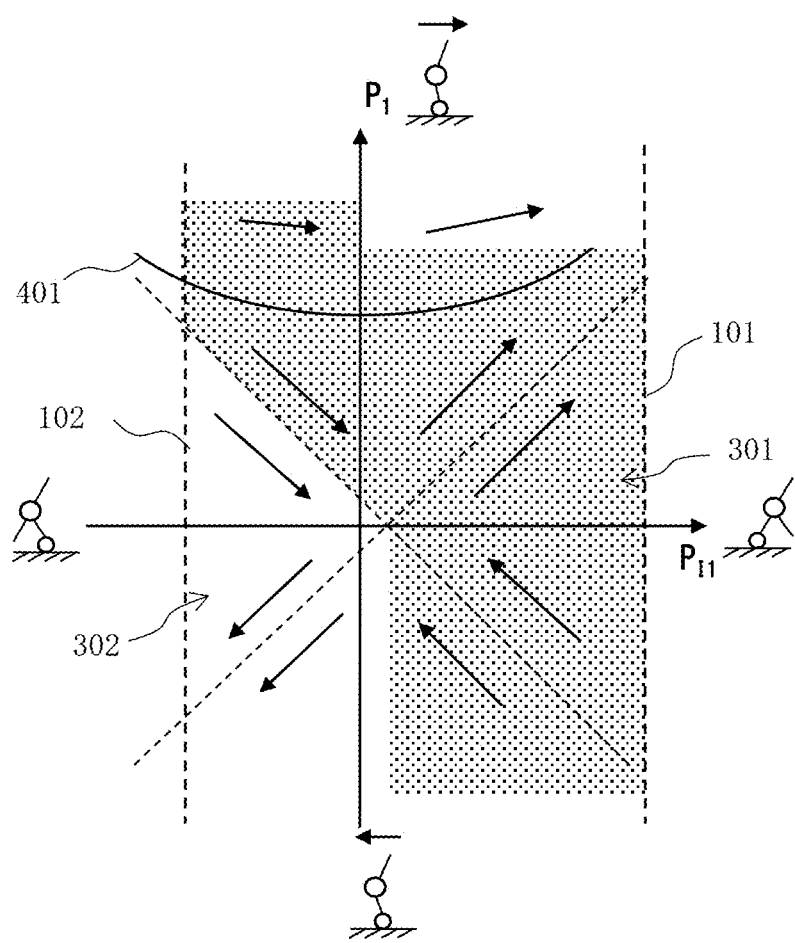
FIG. 7 is a $p_1$-$p_{I1}$ phase diagram to achieve a target walking speed with fewer steps by changing the posture of the body during the walking motion and to avoid stopping during the walking motion.

The above algorithm, additionally including the control to adjust the body posture, enables the robot to reach the target walking state with fewer steps. That is, when the body posture is not vertical, $c_2 \neq 0$. Then, from these expressions (16) and (17), the transition of $p_1$ and $p_{I1}$ will be arrow AR in FIG. 7. At this time, the range of the value of $p_{I1}$ to keep the hip at a certain height or more can be widened to the direction of tilting of the body 20 as in FIG. 7. Thereby the values of $p_1$ and $p_{I1}$ can be closer to the walking line 401 with one step. When the values of $p_1$ and $p_{I1}$ are close enough to the walking line 401, the robot may return the body posture to be vertical, whereby the target walking can be implemented.

The above embodiment assumes the case where external force acts on the robot 1, and the embodiment may include the case where any force to lose the posture balance during walking on the uneven terrain or to cause the falling acts as the disturbance. The above embodiment can apply to the control of posture balance when any force acts during the stepping forward with leg during walking or during stopping from the walking state.

The above embodiment describes a walking robot. The present invention is not limited to such a walking robot, and may apply to legged mechanisms, including a legged robot having an actuator at the ankle, a one-legged or two-legged walking assistance robot having an actuator, or a prosthetic leg. In such application, such a legged mechanism can control the posture balance of the main body including the human body and can avoid the falling. The legs may be two legs on the left and right, and may be three legs, four legs and more legs. The embodiment is not limited to the mode where the legs are stepped forward and backward. The legs may be stepped in other directions, i.e., forward and backward and left and right. To this end, the mechanism may include a spherical joint at the joining part with the body.

The technique of controlling posture balance against external force in the above embodiment may be used in other uses. For instance, in computer graphics (CG), when external force acts on various parts of a virtual character, the behavior of the posture balance has to be reproduced vividly in some cases. Conventionally to this end, sensors are actually attached to the parts of a human body (including other living creatures) and their motions are detected for motion capturing. Instead of this technique, the robot of the above embodiment may be used, whereby behavior information on various types of posture balance can be easily acquired and the information can be used for CG.

As described above, a legged mechanism according to the present invention includes: at least one leg and a body joined with an upper part of the leg so that the body has a changeable posture relative to the leg; and a posture control unit configured to control a posture of the body stably in accordance with states of the leg and the body. Preferably, the legged mechanism further includes: a state calculation unit configured to calculate periodically, from angular information on the leg and the body, angular momentum around a lower end of the leg in a stance phase and integral of the angular momentum; and a determination unit configured to determine whether the calculated angular momentum and integral are approaching or getting away from target values, and output a result of the determination to the posture control unit.

A method for controlling posture of a legged mechanism according to the present invention is to control a posture of the legged mechanism including: at least one leg and a body joined with an upper part of the leg so that the body has a changeable posture relative to the leg; and a posture control unit configured to control a posture of the body stably in accordance with states of the leg and the body. The method preferably includes: a state calculation step of calculating periodically, from angular information on the leg and the body, angular momentum around a lower end of the leg in a stance phase and integral of the angular momentum; and a determination step of determining whether the calculated angular momentum and integral are approaching or getting away from target values, and outputting a result of the determination to the posture control unit.

A recording medium according to the present invention is a computer readable recording medium having stored thereon a program, and the program is to control a posture of a body stably, the body being joined with an upper part of at least one leg so that the body has a changeable posture relative to the leg, the control being performed in accordance with states of the leg and the body. The program preferably makes a computer execute: a state calculation step of calculating periodically, from angular information on the leg and the body, angular momentum around a lower end of the leg in a stance phase and integral of the angular momentum; and a determination step of determining whether the calculated angular momentum and integral are approaching or getting away from target values, and feeding a result of the determination to posture control processing.

With these aspects of the present invention, the body of the legged mechanism is joined with an upper part of at least one leg so that the body has a changeable posture relative to the leg; and the posture control unit can control a posture of the body stably in accordance with states of the leg and the body. The state calculation unit calculates periodically, from angular information on the leg and the body, angular momentum around a lower end of the leg in a stance phase and integral of the angular momentum, and the determination unit determines whether the calculated angular momentum and integral are approaching or getting away from target values, i.e., the posture is stabilizable or not, and outputs a result of the determination to the posture control unit. Thus, the legged mechanism has a simple configuration, and can keep the balance of the posture of the body, i.e., of the posture of the legged mechanism, so that the legged mechanism can avoid the falling against disturbance including external force.

The legged mechanism preferably includes an angular sensor configured to detect angular information on the leg and the body, and at least one of the angular sensor can detect an angle relative to a direction of the gravity. This configuration includes a sensor capable of detecting an angle relative to the direction of the gravity as at least one of the angular sensors, and therefore enables calculation of the angular momentum around the lower end of the leg and its integral.

Preferably, the legged mechanism further includes a leg actuator configured to join the body with an upper part of each of a plurality of legs so that the body has a changeable posture relative to the legs, and the posture control unit includes: a first posture control unit configured to, when a result of the determination shows that the calculated angular momentum and integral are approaching target values, drive the leg actuator while stopping the position of the lower end of each leg so as to stabilize a posture of the body; and a second posture control unit configured to, when a result of the determination shows that the calculated angular momentum and integral are getting away from target values, drive any one of the leg actuator for stepping forward of the corresponding leg so as to stabilize a posture of the body. With this configuration, depending on whether the calculated angular momentum and integral are approaching or getting away from target values, i.e., whether the posture is stabilizable or not, the first posture control unit controls the balance of posture without changing the legs for step or the second posture control unit controls the balance of posture by changing the legs for step. Thereby, the posture of the legged mechanism can be balanced reliably.

Preferably the posture control unit sets a target value of posture of the body for the leg actuator based on the angular momentum and the integral at the time of determination. With this configuration, the posture control unit sets a target value based on the angular momentum and integral calculated before at the time of determination. This can facilitate the processing.

Preferably a walking robot includes: a legged mechanism having a plurality of legs; and a walking control unit configured to manipulate leg actuators of the plurality of legs individually for walking of the legged mechanism. This configuration facilitates the control of posture balance of the walking robot during rest that is essential for the walking robot. The posture balancing control can be used against disturbance for the walking robot during walking as well.

Preferably the walking robot has each of the legs that is divided at some part along a longitudinal direction of the leg, and the divided parts of the leg are joined so as to be rotatable relatively or be elongated or contracted via a joint actuator. With this configuration, the relative angle of each joint and the length of the leg can be controlled by manipulating the joint actuator, and so the performance to control the posture balance can be improved, and the precision of the landing position also can be improved.

REFERENCE SIGNS LIST

1 Walking robot (legged mechanism)
10 Leg
20 Body (main body)
30 Motor (actuator)
31 Leg motor (leg actuator)
40 Angular sensor
100 Control unit (posture control unit)
102 Angular momentum calculation unit (state calculation unit)
103 Integral calculation unit (state calculation unit)
104 Stabilization determination unit (determination unit)
105 Posture target setting unit (first posture control unit)
106 Stepping-forward instruction unit (second posture control unit)
107 Stepping-forward target setting unit (second posture control unit)

The invention claimed is:

1. A legged mechanism, comprising: at least one leg and a body joined with an upper part of the leg so that the body has a changeable posture relative to the leg;
   a posture control unit configured to control a posture of the body stably in accordance with states of the leg and the body,
   a state calculation unit configured to calculate periodically, from angular information on the leg and the body, angular momentum around a lower end of the leg in a stance phase and integral of the angular momentum; and
   a determination unit configured to determine whether the calculated angular momentum and integral are approaching or getting away from target values, and output a result of the determination to the posture control unit.

2. The legged mechanism according to claim 1, further comprising an angular sensor configured to detect angular information on the leg and the body, wherein at least one of the angular sensor can detect an angle relative to a direction of the gravity.

3. The legged mechanism according to claim 1, further comprising leg actuators configured to join the body with an upper part of each of a plurality of legs so that the body has a changeable posture relative to the legs, wherein the posture control unit includes:
   a first posture control unit configured to, when the result of the determination shows that the calculated angular momentum and integral are approaching the target values, drive the leg actuators while stopping a position of the lower end of each leg so as to stabilize the posture of the body; and
   a second posture control unit configured to, when the result of the determination shows that the calculated angular momentum and integral are getting away from the target values, drive any one of the leg actuators for stepping forward of a corresponding leg so as to stabilize the posture of the body.

4. The legged mechanism according to claim 3, wherein the posture control unit sets a target value of the posture of the body for the leg actuator based on the angular momentum and the integral at the time of determination.

5. A walking robot comprising: the legged mechanism according to claim 3; and a walking control unit configured to manipulate the leg actuators of the plurality of legs individually for walking of the legged mechanism.

6. The walking robot according to claim 5, wherein each of the legs is divided at some part along a longitudinal direction of the leg, and all divided parts of the leg are joined so as to be rotatable relatively or be elongated or contracted via a joint actuator.

7. A method for controlling a posture of a legged mechanism, the legged mechanism comprising: at least one leg and a body joined with an upper part of the leg so that the body has a changeable posture relative to the leg; and a posture control unit configured to control a posture of the body stably in accordance with states of the leg and the body, the method comprising:
   a state calculation step of calculating periodically, from angular information on the leg and the body, angular momentum around a lower end of the leg in a stance phase and integral of the angular momentum; and
   a determination step of determining whether the calculated angular momentum and integral are approaching or getting away from target values, and outputting a result of the determination to the posture control unit.

8. A non-transitory computer readable medium having stored thereon a program, the program being to control a posture of a body stably, the body being joined with an upper part of at least one leg so that the body has a changeable posture relative to the leg, the control being performed in accordance with states of the leg and the body, the program making a computer execute:
   a state calculation step of calculating periodically, from angular information on the leg and the body, angular momentum around a lower end of the leg in a stance phase and integral of the angular momentum; and
   a determination step of determining whether the calculated angular momentum and integral are approaching or getting away from target values, and feeding a result of the determination to posture control processing.

* * * * *